United States Patent
Hamamura et al.

(10) Patent No.: US 9,805,062 B2
(45) Date of Patent: Oct. 31, 2017

(54) ADDRESS RECOGNITION APPARATUS, SORTING APPARATUS, INTEGRATED ADDRESS RECOGNITION APPARATUS AND ADDRESS RECOGNITION METHOD

(71) Applicant: Kabushiki Kaisha Toshiba, Minato-ku (JP)

(72) Inventors: Tomoyuki Hamamura, Tokyo (JP); Masaya Maeda, Tokyo (JP); Bunpei Irie, Kanagawa-ken (JP); Ying Piao, Tokyo (JP); Yuka Watanabe, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 6 days.

(21) Appl. No.: 14/834,760

(22) Filed: Aug. 25, 2015

(65) Prior Publication Data
US 2016/0063034 A1 Mar. 3, 2016

(30) Foreign Application Priority Data
Aug. 28, 2014 (JP) .................................. 2014-174394

(51) Int. Cl.
*G06F 17/30* (2006.01)
*G06K 9/62* (2006.01)
(Continued)

(52) U.S. Cl.
CPC .......... *G06F 17/30253* (2013.01); *B07C 3/14* (2013.01); *G06K 9/00463* (2013.01);
(Continued)

(58) Field of Classification Search
CPC . G06F 17/30253; B07C 3/14; G06K 9/00463; G06K 9/2054; G06K 9/6255; G06K 9/72
See application file for complete search history.

(56) References Cited

U.S. PATENT DOCUMENTS

| 7,580,544 B2 | 8/2009 | Maeda et al. | |
| 2005/0010540 A1* | 1/2005 | Aoki | G06K 9/726 705/401 |
| 2006/0215878 A1* | 9/2006 | Maeda | B07C 3/14 382/101 |

(Continued)

FOREIGN PATENT DOCUMENTS

| EP | 1 704 932 A2 | 9/2006 |
| JP | 2000-202371 | 7/2000 |

(Continued)

OTHER PUBLICATIONS

Wikipedia, "AdaBoost" [online], 2016 [retrieved on Oct. 26, 2016]. Retrieved from the Internet <URL: https://en.wikipedia.org/wiki/AdaBoost >, 7 pages.*

(Continued)

*Primary Examiner* — David F Dunphy
(74) *Attorney, Agent, or Firm* — Oblon, McClelland, Maier & Neustadt, L.L.P.

(57) ABSTRACT

An address recognition apparatus has an address recognition section, and a non-addressee determination section. The address recognition section acquires, based on an image of an object, address information described on the object. The non-addressee determination section determines, based on a comparison result of information relating to first address information that is the address information acquired in the address recognition section at a desired timing, and information relating to second address information that is the address information acquired in the address recognition section before the first address information, whether or not the first address information is a non-destination address that is not an address of an addressee.

15 Claims, 8 Drawing Sheets

(51) Int. Cl.
    *G06K 9/72*     (2006.01)
    *B07C 3/14*     (2006.01)
    *G06K 9/00*     (2006.01)
    *G06K 9/20*     (2006.01)

(52) U.S. Cl.
    CPC ......... *G06K 9/2054* (2013.01); *G06K 9/6255* (2013.01); *G06K 9/72* (2013.01); *G06K 2209/01* (2013.01); *G06K 2209/19* (2013.01)

(56) References Cited

U.S. PATENT DOCUMENTS

2006/0245654 A1*  11/2006  Viola ................. G06K 9/00463
    382/229
2007/0098216 A1*  5/2007  Goyal ....................... B07C 3/00
    382/101

FOREIGN PATENT DOCUMENTS

| | | |
|---|---|---|
| JP | 2004-188299 | 7/2004 |
| JP | 2007-698 | 1/2007 |
| JP | 2007-222744 | 9/2007 |
| JP | 2011-125860 | 6/2011 |

OTHER PUBLICATIONS www.altova.com, "Database Editor" [online], published Oct. 2, 2013 [retrieved on Feb. 24, 2017]. Retrieved from the Internet <URL: http://web.archive.org/web/20131002105623/http://www.altova.com/databasespy/database-content-editor.html >, 1 page.*
Extended European Search Report dated Mar. 2, 2016 in Patent Application No. 15181509.9.

* cited by examiner

TE

| ADDRESS INFORMATION | DESCRIPTION POSITION | IMAGE ID | SHEET ID |
|---|---|---|---|
| 11302611-2-5 | (512, 370), (1054, 596) | 4105 | 00001 |
| 2050001351-1 | (147, 1682), (428, 1831) | 4106 | 00001 |
| 2050001351-1 | (143, 1680), (425, 1825) | 4107 | 00002 |
| 2050001351-1 | (148, 1678), (424, 1827) | 4108 | 00003 |
| 611801211-7 | (503, 373), (1129, 591) | 4109 | 00003 |
| ⋮ | ⋮ | ⋮ | ⋮ |

TF

| ADDRESS INFORMATION | DESCRIPTION POSITION | IMAGE ID | SHEET ID |
|---|---|---|---|
| 31481211 | (98, 162), (325, 355) | 56 | 00001 |
| 10100011-57 | (2149, 1530), (2466, 1674) | 407 | 00005 |
| 12080121-1 | (243, 1507), (481, 1598) | 3838 | 0010 |
| 2050001351-1 | (147, 1682), (428, 1831) | 4106 | 0011 |
| ⋮ | ⋮ | ⋮ | ⋮ |

FIG. 6

ADDRESS RECOGNITION APPARATUS, SORTING APPARATUS, INTEGRATED ADDRESS RECOGNITION APPARATUS AND ADDRESS RECOGNITION METHOD

CROSS-REFERENCE TO RELATED APPLICATION

This application is based upon and claims the benefit of priority from the prior Japanese Patent Application No. 2014-174394, filed on Aug. 28, 2014, the entire contents of which are incorporated herein by reference.

FIELD

Embodiments of the present invention relate to an address recognition apparatus, a sorting apparatus, an integrated address recognition apparatus and an address recognition method.

BACKGROUND

In the fields of mail and distribution, an art of address recognition to read an address described on an object has been widely used. A sorter to sort an object in accordance with an address of an addressee which has been recognized has been widespread. Both of an address of an addressee and an address of a sender are described side by side on an object, in many cases. For this reason, when a sorter erroneously recognizes an address of a sender as an address of an addressee, there was a problem that the object is returned back to the sender.

For this problem, an address of a specific customer is previously registered, and when the recognized address coincides with the address of the specific customer, a method for not recognizing the recognized address as an address of an addressee has been proposed. However, regarding a sender except a specific customer, there is a case that an address of a sender is erroneously determined as an address of an addressee. In addition, also when an address of a specific customer is changed, there is a case that an address of a sender is erroneously determined as an address of an addressee.

BRIEF DESCRIPTION OF THE DRAWINGS

FIG. 6 is a diagram showing an example of a non-destination address table stored in the sender information storage section of the embodiment.

DETAILED DESCRIPTION

An address recognition apparatus of an embodiment has an address recognition section, and a non-addressee determination section. The address recognition section acquires, based on an image of an object, address information described on the object. The non-addressee determination section determines, based on a comparison result of information relating to first address information that is the address information acquired in the address recognition section at a desired timing, and information relating to second address information that is the address information acquired in the address recognition section before the first address information, whether or not the first address information is a non-destination address that is not an address of an addressee.

Hereinafter, an address recognition apparatus, a sorting apparatus, an integrated address recognition apparatus and an address recognition method of embodiments will be described with reference to the drawings.

In the following description, a sheet processing apparatus 101 will be described, as an example of a sorting apparatus.

Figure 1:
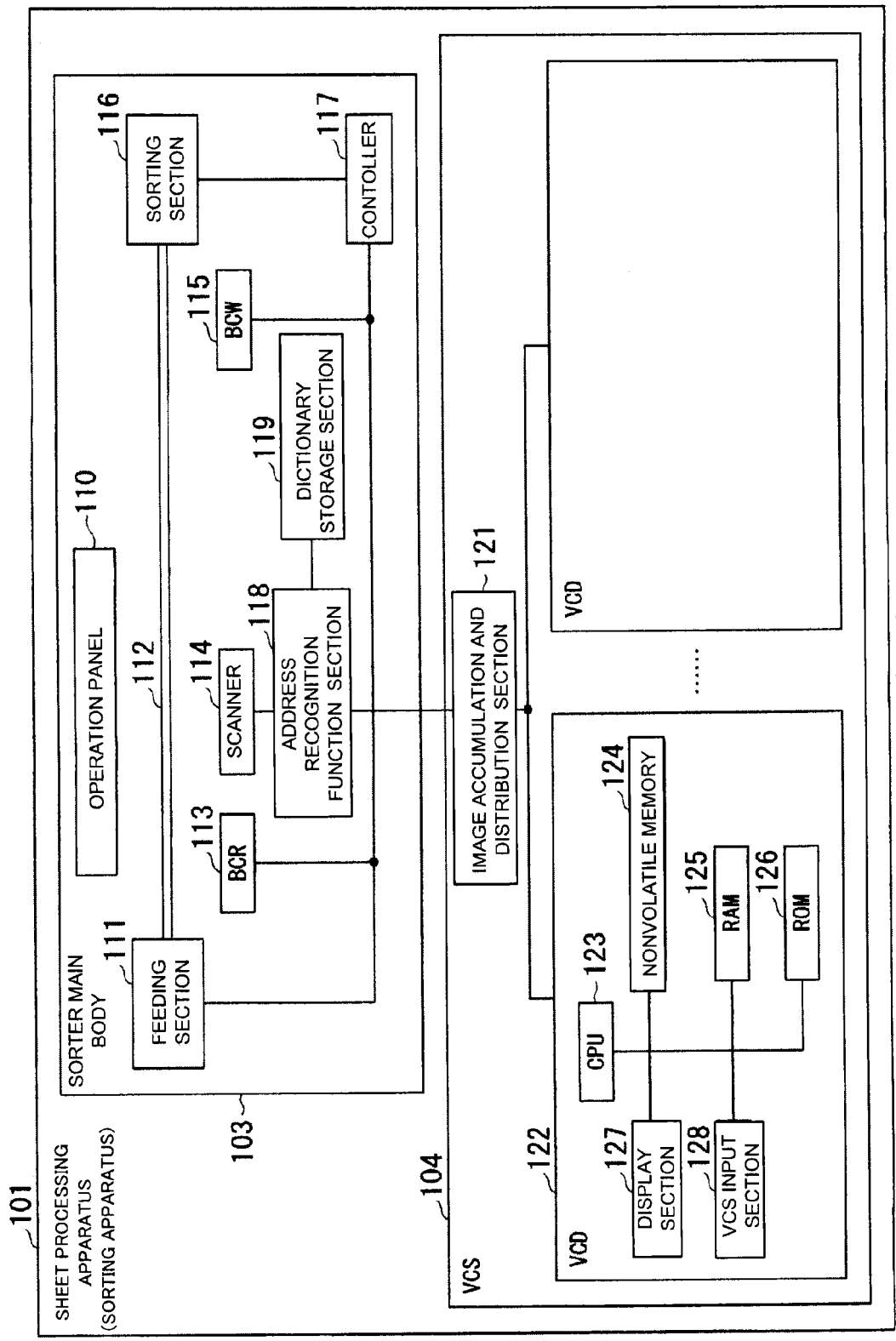
FIG. 1 is a block diagram schematically showing a configuration example of a sheet processing apparatus of an embodiment.

FIG. 1 is a block diagram schematically showing a configuration example of the sheet processing apparatus 101 of an embodiment. The sheet processing apparatus 101 recognizes sorting information described on a sheet (an object), and sorts the sheet based on the recognition result. The sorting information is information which is read from a sheet for sorting the sheet. In the embodiment, the sorting information is information which is expressed in characters, such as an address described on a sheet. The sheet processing apparatus 101 sorts a sheet such as a postal matter or a ledger sheet, for example, based on the address described in characters.

In addition, the sorting apparatus is not limited to the sheet processing apparatus 101. For example, the sorting apparatus may be an apparatus to sort an article such as a packing article and a cargo (a parcel, a parcel delivery service, for example), based on the sorting information stated on the article.

In the configuration example shown in FIG. 1, the sheet processing apparatus 101 is provided with a sorter main body 103, a video coding system (Hereinafter, abbreviated as VCS) 104. The sorter main body 103 and the VCS 104 are communicably connected to each other.

To begin with, the sorter main body 103 will be described.

The sorter main body 103 of the sheet processing apparatus 101 sorts a sheet to a sorting destination according to the address information, based on the recognized address information. The processing to sort a sheet which is executed by the sorter main body 103 is called a sorting processing.

As shown in FIG. 1, the sorter main body 103 is provided with an operation panel 110, a feeding section 111, a main conveying mechanism 112, a bar code reader (Hereinafter, abbreviated as BCR) 113, a scanner 114, a bar code writer (Hereinafter, abbreviated as BCW) 115, a sorting section 116, a controller 117, an address recognition function section 118, a dictionary storage section 119.

In the sorter main body 103, to begin with, the address recognition function section 118 performs address recognition. The address recognition function section 118 recognizes address information from an image of a sheet which is read by the scanner 114, with reference to a dictionary for character recognition and an address database stored in the dictionary storage section 119. The sorter main body 103 performs sorting processing of a sheet, based on the address information recognized by the address recognition function section 118.

When address information is not recognized by the address recognition function section 118, the sorter main body 103 sends the image of the relevant sheet which the scanner 114 has read to the VCS 104. The VCS 104 makes the image of the sheet which the scanner 114 has read to be displayed on a display section. An operator sees the image of the sheet displayed on the display section, and inputs address information to the VCS 104 via an input section. The VCS 104 transmits the address information inputted by the operator to the sorter main body 103, along with identification information of the sheet. The sorter main body 103 stores the address information inputted by the operator, and the identification information assigned to the sheet in the storage section in association.

When the address information inputted by the operator in the VCS 104 is inputted to the sorter main body 103, the sorter main body 103 performs sorting processing of the sheet based on the address information. In the embodiment, regarding the sheet from which the address information cannot be recognized, after a bar code including the identification information is printed on the sheet, the sheet is discharged to a VCS rejection pocket. The sheet which has been discharged in the VCS rejection pocket is inputted in the sheet processing apparatus 101 again. The sorter main body 103 reads the identification information from the bar code of the sheet, reads the address information which the operator has inputted from the storage section, based on the identification information, and executes the sorting processing based on the read address information. In addition, without being limited to this, the sorter main body 103 may perform a sorting processing of the sheet from which address information cannot be recognized, without discharging the sheet to the VCS rejection pocket.

The operation panel 110 is provided with an operation section and a display section. The operation section includes a touch panel, a mechanical keyboard, and other operation device, for example, and accepts a kind of a processing mode designated from an operator. The display section is an Liquid Crystal Display (LCD), and an organic Electroluminescence (EL) display device, for example, and displays an operation state of the sheet processing apparatus 101, and so on.

The feeding section 111 stocks sheets which have been set. The feeding section 111 takes out the sheets loaded in a stacked state one by one, and feeds the taken out sheet to the main conveying mechanism 112. For example, the feeding section 111 is provided with a separation roller. The separation roller comes in contact with the sheet at the lower end in the stacking direction, in the state that the sheets are inputted in the feeding section 111. The separation roller rotates, and thereby feeds the sheets set in the feeding section 111 from the lower end in the stacking direction one by one to the main conveying mechanism 112 with a definite pitch.

The main conveying mechanism 112 conveys the sheet to the respective sections in the sheet processing apparatus 101. The main conveying mechanism 112 is provided with conveying belts which sandwich the sheet, and a drive pulley to drive the conveying belts, and so on. The main conveying mechanism 112 drives the drive pulley by a drive motor, and thereby conveys the sheet which has been sandwiched by the conveying belts or the sheet loaded on the conveying belt. The conveying path of a sheet by the main conveying mechanism 112 is called a main conveying path. The BCR 113, the scanner 114, the BCW 115, the sorting section 116, and so on are provided on the main conveying path.

The BCR 113 reads a bar code such as an ID bar code or a destination bar code which is printed on a sheet to be conveyed on the main conveying path. The ID bar code is a bar code including unique identification information (Hereinafter, called a sheet ID) assigned to each sheet. The destination bar code is a bar code including address information. The BCR 113 has a reading section to read an image of a bar code, and a recognition section to recognize data which a bar code indicates in the read image. When reading the image of the bar code, the reading section supplies the image of the relevant bar code to the recognition section. The recognition section processes the supplied relevant bar code image, and recognizes the data included in the relevant bar code. The recognized data is supplied to the controller 117.

The scanner 114 reads the image of the sheet to be conveyed by the main conveying mechanism 112. The scanner 114 is provided with a lighting section and an optical sensor, for example. The lighting section irradiates the sheet to be conveyed by the main conveying mechanism 112 with light. The optical sensor is provided with a light receiving element such as a Charge Coupled Device (CCD) and an optical system (lens). In the optical sensor, the optical system receives a reflected light reflected from the sheet, and images the received reflected light on the CCD, and the CCD outputs an electric signal (an image). The scanner 114 continuously reads images from the sheet which is to be conveyed by the main conveying mechanism 112, and thereby acquires the whole image of each sheet. The scanner 114 supplies the acquired image to the address recognition function section 118. In addition, the scanner 114 may be composed of a video camera, and so on.

The controller 117 totally controls operations of the respective sections of the sheet processing apparatus 101. The controller 117 is provided with a processor such as a Central Processing Unit (CPU), a buffer memory, a program memory, a nonvolatile memory, and so on. The CPU executes various calculation processings. The buffer memory temporarily stores the result of the calculation performed by the CPU. The program memory and the nonvolatile memory store various programs which the CPU executes and control data and so on. The CPU executes the program stored in the program memory, and thereby the controller 117 can perform various processings. The controller 117 assigns a sheet ID to a sheet, for example, to manage the sheet ID.

The address recognition function section 118 recognizes address information contained in the image of the sheet which has been read by the scanner 114, with reference to the dictionary for character recognition and the address database stored in the dictionary storage section 119. The address information includes not only an address, but also information attached to the address, such as a postal code, a trade name, a full name, a telephone number. The address recognition function section 118 segments an area (Hereinafter, called an address area) where the address information is described from the image of the sheet, and recognizes an address contained in each address area. The detail will be described later, with reference to FIG. 2. When the address information has been recognized, the address recognition function section 118 supplies the address information including the recognized address to the controller 117. When the address information has not been recognized, the address recognition function section 118 transmits information (coding data) for video coding to an image accumulation and distribution section 121. The coding data includes an image of a sheet and character recognition result. In addition, when a plurality of address areas have been detected from a sheet, the address recognition function section 118 determines the sheet from which at least one address information has not been recognized, as one from which address information has not been recognized.

The BCW 115 prints an ID bar code or a destination bar code on a sheet, if necessary. For example, the BCW 115 prints a destination bar code in which the address information as the recognition result is bar-coded, on the sheet from which the address information has been recognized by the address recognition function section 118. On the other hand, the BCW 115 prints an ID bar code in which a sheet ID is bar-coded, on the sheet from which the address information has not been recognized by the address recognition function section 118.

The sheet ID indicated by the ID bar code is information for associating key-inputted address information in the VCS 104 with a sheet. That is, a sheet on which an ID bar code is printed is a sheet to be processed by the VCS 104.

The sorting section 116 is provided at the downstream side of the BCW 115 in the conveyance direction of a sheet. The sorting section 116 sorts a sheet to a sorting destination according to the address information and so on. This sorting section 116 includes a plurality of sorting pockets (not shown) partitioned by a plurality of stages and a plurality of lines. Each sorting pocket is set so as to correspond to each sorting destination. The sorting section 116 sequentially stacks sheets in sorting pockets corresponding to the address information, based on the address information.

In addition, in the sorting section 116, a VCS rejection pocket (not shown) in which a sheet from which the sorting destination could not be recognized is to be stacked is provided. The sheet which has been stacked in this VCS rejection pocket is re-fed to the feeding section 111, after the address information has been inputted in the VCS 104. The sheet which has been re-fed to the feeding section 111 is re-sorted based on the ID code printed on the relevant sheet, and the address information inputted in the VCS 104. The controller 117 sorts a sheet to each pocket of the sorting section 116, based on the address information as the sorting information.

Next, the VCS 104 will be described.

The VCS 104 is provided with the image accumulation and distribution section 121, and a plurality of video coding desks (Hereinafter, abbreviated as VCD) 122. The image accumulation and distribution section 121 is realized by a computer having a controller, a storage section, and various interfaces and so on. The VCD 122 is realized by a computer having a display section, an input section, a controller, a storage section, and various interfaces and so on, and a desk on which this computer is loaded.

The sorter main body 103 and the respective VCDs 122 are connected to the image accumulation and distribution section 121. The image accumulation and distribution section 121 receives information (coding data) for video coding including the image of the sheet from which the address information could not be recognized by the address recognition function section 118 in the sorter main body 103, from the sorter main body 103. The image accumulation and distribution section 121 monitors the operating status of each VCD 122, and distributes the coding data received from the sorter main body 103 to each VCD 122, in accordance with the operating status of each VCD 122.

Each VCD 122 displays the image of the sheet included in the coding data distributed from the image accumulation and distribution section 121 on a display section 127, and urges an operator to input correct address information (character information). The VCD 122 returns input information including character information which an operator has inputted as the address information, in the state that the image of the sheet is displayed on the display section 127, to the image accumulation and distribution section 121. The image accumulation and distribution section 121 performs a processing to return the input information acquired from each VCD 122 to the sorter main body 103.

In the configuration example shown in FIG. 1, the VCD 122 is provided with a CPU 123, a nonvolatile memory 124, a Random Access Memory (RAM) 125, a Read Only Memory (ROM) 126, the display section 127, a VCS input section 128.

The CPU 123 functions as a controller to manage the control of the whole of the VCD 122. The CPU 123 performs various processings based on the control program and the control data stored in the ROM 126 or the nonvolatile memory 124. For example, the CPU 123 executes a program of an operating system, to perform fundamental operation control of the VCD 122. In addition, a part of the various functions may be realized by a hardware circuit. The nonvolatile memory 124 is a rewritable nonvolatile memory, such as an Electrically Erasable Programmable Read-Only Memory (EEPROM), a flash ROM, a Hard disk drive (HDD), or a Solid State Disk (SSD), or the like.

The nonvolatile memory 124 stores a control program, control data, and various data, in accordance with an operation purpose of the VCD 122. For example, the nonvolatile memory 124 stores coding data including the image (image containing a character image) for video coding which is supplied from the image accumulation and distribution section 121. In addition, the nonvolatile memory 124 may store the input information which an operator inputs.

The RAM 125 is a volatile memory. The RAM 125 temporarily stores the data which the CPU 123 is processing, and so on. For example, the RAM 125 stores image data for display, or stores the input information which an operator inputs.

The ROM 126 is a non-rewritable nonvolatile memory in which a program for control and control data and so on are previously stored.

The display section 127 includes an LCD, an organic EL display device, or the like, for example. The display section displays an image (an image of a sheet, for example) for video coding which is supplied from the image accumulation and distribution section 121, and so on. The display section 127 may display not only an image (an image containing characters to be recognized) of a sheet as the image for video coding, but also information within an range which can be recognized at the sorter main body 103 side.

The VCS input section 128 is a device for an operator to input the character information as the address information contained in the image displayed on the display section 127. For example, the VCS input section 128 is composed of a keyboard and a pointing device and so on.

Next, a schematic configuration of an address recognition apparatus according to the embodiment will be described, with reference to FIG. 2. In the embodiment, the address recognition apparatus corresponds to the above-described address recognition function section 118.

Figure 2:
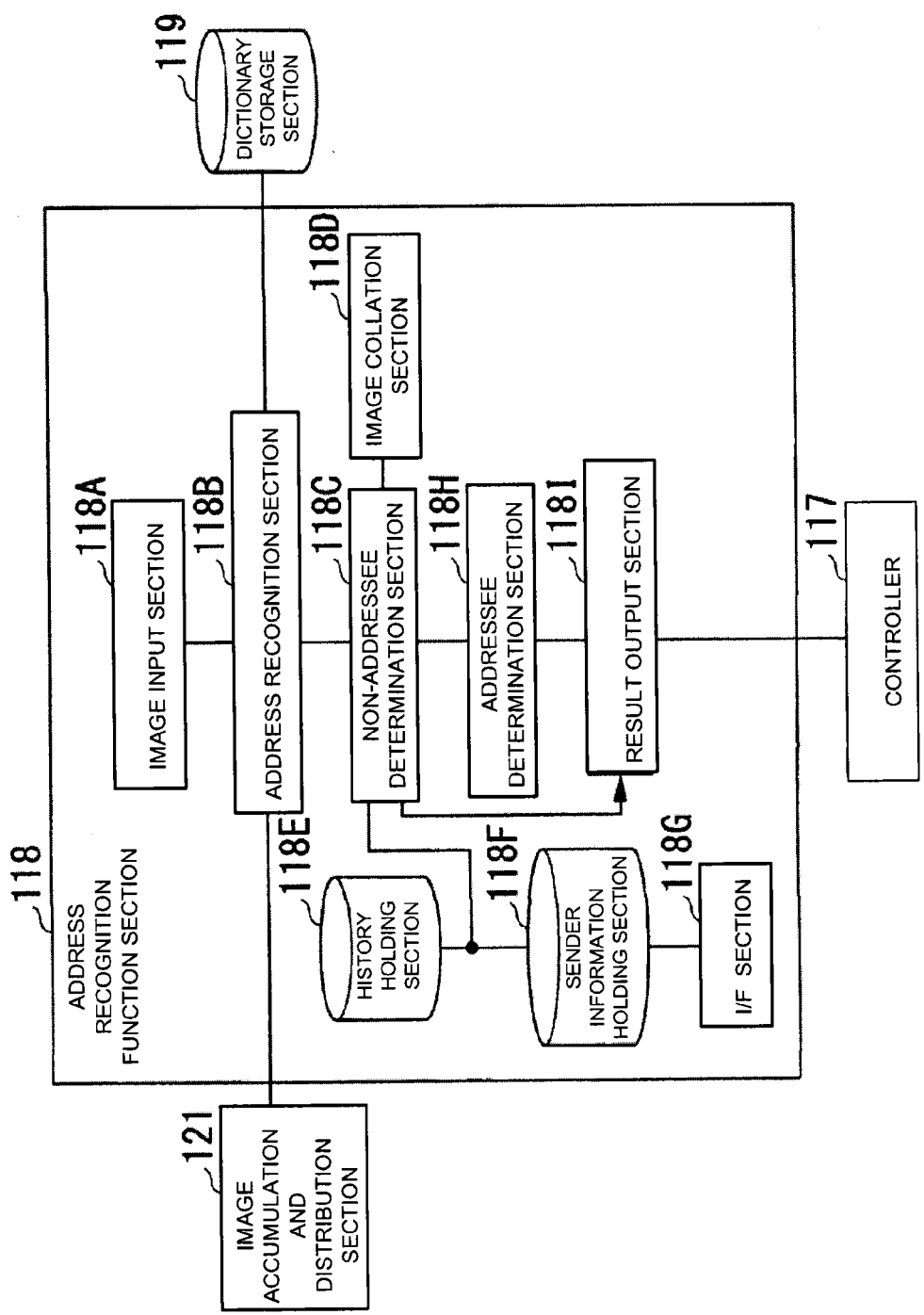
FIG. 2 is a block diagram showing a functional configuration of the address recognition function section of the embodiment.

FIG. 2 is a block diagram showing a functional configuration of the address recognition function section 118. As shown in FIG. 2, the address recognition function section 118 is provided with an image input section 118A, an address recognition section 118B, a non-addressee determination section 118C, an image collation section 118D, a history holding section 118E, a sender information storage section 118F, an interface (I/F) section 118G, an addressee determination section 118H, a result output section 118I. The address recognition section 118B, the non-addressee determination section 118C, the image collation section 118D, and the result output section 118I are each a function section which functions, by means that a CPU which the address recognition function section 118 is provided with executes a program, for example. In addition, a part or all of these function sections may be a hardware function section such as a Large Scale Integration (LSI) or an Application Specific Integrated Circuit (ASIC).

The image input section 118A acquires the image read by the scanner 114.

The address recognition section 118B firstly detects an address area where an address is described, from the image acquired by the image input section 118A. And the address recognition section 118B recognizes an address described in the detected address area, and outputs address information that is the recognition result. When a plurality of address areas are detected, the address recognition section 118B may recognize addresses of the whole address areas, or may recognize an address of a part of the address areas.

The non-addressee determination section 118C determines whether or not the address information which the address recognition section 118B has acquired is a non-destination address that is not an address of an addressee, with reference to the history holding section 118E and the sender information storage section 118F.

The image collation section 118D is a function section which is called by the non-addressee determination section 118C. The image collation section 118D performs image processing of two images to be compared, and determines whether or not the two images are similar. In addition, as the processing to determine whether or not images are similar, a publicly-known processing method can be adopted, such as a processing to compare feature amounts of the images, a process to extract an edge point and perform pattern matching.

The history holding portion 118E holds the history of the processing result of the address recognition section 118B.

The sender information storage section 118F holds information relating to the address information of a sender. In the sender information storage section 118F, one which has been specified as an address of a sender is stored, out of the information held in the history holding section 118E.

The I/F section 118G is an I/F for an operator to edit information relating to the address information of the sender which is stored in the sender information storage section 118F. The I/F section 118G accepts an editing operation from an operator, and edits information relating to the address information to be stored in the sender information storage section 118F. Here, editing includes change, new addition, deletion and so on of the information relating to the address information. In addition, it is also included in editing to replace an image by an image subjected to image processing such as noise removal.

The addressee determination section 118H determines address information which is determined to be not a non-destination address by the non-addressee determination section 118C as an address of an addressee. When there are a plurality of address information which are determined to be not a non-destination address, the addressee determination section 118H may determine an address in which a possibility that the address is an address of an addressee is the highest out of these, as an address of an addressee. For example, the addressee determination section 118H determines an address in which a possibility that the address is an address of an addressee is the highest, based on the position where the address is described.

The result output section 118I outputs the final destination address recognition result. The processing of the result output section 118I will be described later.

Figure 3:
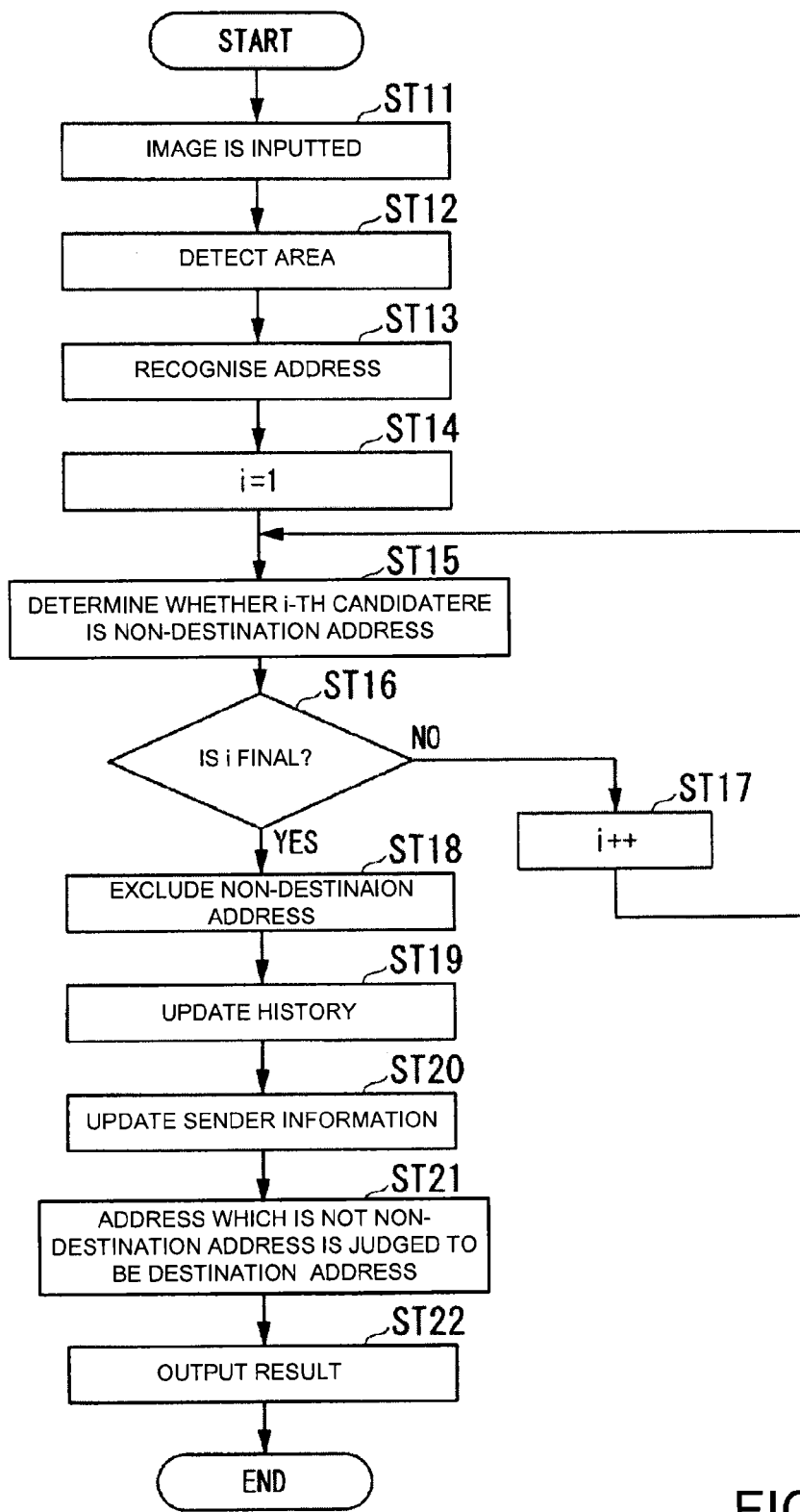
FIG. 3 is a flow chart showing an example of a flow of a processing by the address recognition function section of the embodiment.

Next, an example of a flow of a processing by the address recognition function section 118 will be described with reference to FIG. 3. FIG. 3 is a flow chart showing an example of a flow of a processing by the address recognition function section 118.

To begin with, an image of a sheet is inputted in the image input section 118A (step ST11). The inputted image is arranged on a memory, for example.

The address recognition section 118B analyzes the image inputted to the image input section 118A in the step ST11, and extracts at least one address area (step S12). The address area is an area where one address is described. The extraction method may be optional. As an example, a method which extracts a line candidate from the arrangement of character candidates, and further extracts an address area from the arrangement of the line candidates can be used.

Figures 4, 5:
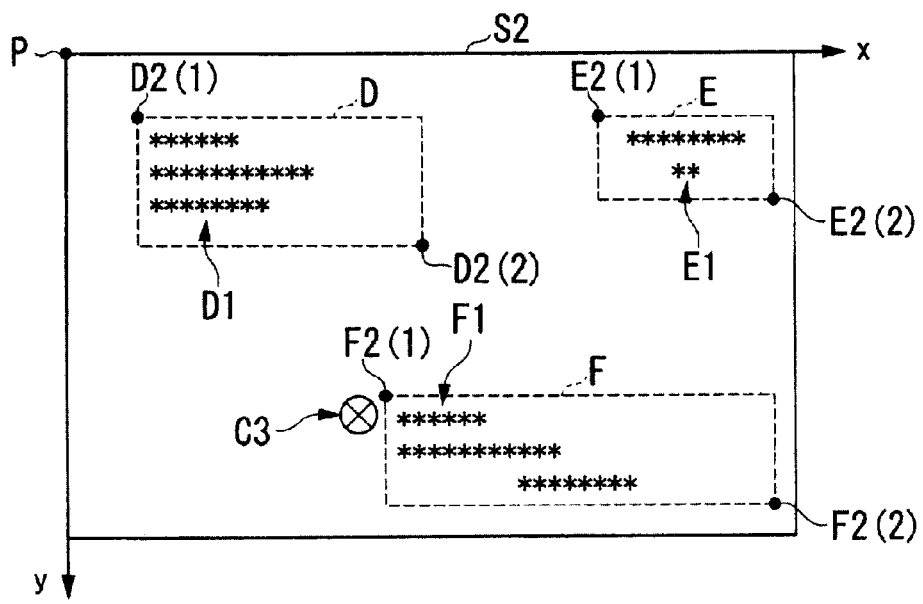
FIG. 4 is a diagram for explaining a processing by the address recognition section of the embodiment.
FIG. 5 is a diagram showing an example of a history table stored in the history storage section of the embodiment.

FIG. 4 is a diagram for explaining a processing by the address recognition section 118B. Here, a sheet to be processed by the address recognition section 118B is referred to as a sheet S2. The address recognition section 118B detects address areas D, E, F from the sheet S2. The address recognition section 118B recognizes respective addresses in the detected address areas D, E, F, and thereby acquires address information D1, E1, F1. In addition, the address recognition section 118B obtains description positions D2, E2, F2 of the respective address areas D, E, F. The description positions D2, E2, F2 are each expressed by a coordinate value (x, y) when an upper left vertex of the sheet S2 is determined as an origin P. In the embodiment, the description position D2 is information including a coordinate value of an upper left vertex D2(1) of the address area D2, and a coordinate value of a lower right vertex D2(2). The description positions E2, F2 are the same as the description position D2.

In addition, the address recognition section 118B segments an image including the address area D and its peripheral area, an image including the address area E and its peripheral area, and an image including the address area F and its peripheral area, respectively. In a sheet, in the vicinity of a place where an address of a sender is described, a possibility that a logo or the like of a company that is a large customer exists is high. Accordingly, the address recognition section 118B segments an image including each address area and its periphery, and stores it in a history table 51 of the history holding section 118E. It is preferable that a size of an image which is segmented as the image including an address area and its periphery is broader than a range including a logo or the like of a company described in the vicinity of an address of a sender. The address recognition section 118B assigns an image ID for identifying each image to the segmented image.

And, the address recognition section 118B stores information in which address information, a description position, an image ID, and a sheet ID are associated with each other, for example, in the history table 51 of the history holding section 118E.

FIG. 5 is a diagram showing an example of a history table TE to be stored in the history holding section 118E. In one record of each table, a set of information which are associated with each other is stored. In addition, the arrangement of respective items in the figure is only an example, and may be changed optionally. In addition, FIG. 6 is a diagram showing an example of a sender information table TF to be stored in the sender information storage section 118F. In the sender information table TF, information relating to address information of a person who has been specified as the sender by the processing described later is stored.

Address information is stored in a first item of each record, for example. The address information is address information which has been recognized from the address area. In the examples of FIGS. 5, 6, address information coded information, such as a code obtained by combining a postal code and town block information, is stored. In a second item of each record, a description position is stored, for example. The description position is a position where an address area is described. In addition, it is preferable that the description position is normalized. That is, since there is a possibility that during conveying an object (sheet), the object rotates or moves in parallel, for example, an image of the object is rotated according to the vertical and horizontal directions of the object, and the normalization such that the upper left corner of the object is determined as an origin is preferably performed. In a third item of each record, an image ID is stored, for example. In addition, data of the image given with an image ID is stored in the history holding section 118E or the sender information storage section 118F. In a fourth item of each record, a sheet ID is stored, for example. The sheet ID is unique identification information which is assigned to each sheet. In addition, in each table, information except the information shown in FIGS. 5, 6 may be stored. For example, an image file name, an image acquisition time, a size of an image, and so on may be stored.

Here, when a plurality of address areas are extracted from a sheet, the address recognition section 118B gives orders in accordance with the description positions of the address areas, respectively. Regarding the orders in accordance with the description positions of the address areas, a position where a possibility that the address is described as an address of an addressee is high is set to be high, and a position where a possibility that the address is described as an address of an addressee is low is set to be low. In other words, regarding the orders in accordance with the description positions of the address areas, a position where a possibility that the address is described as an address of a sender is low is set to be high, and a position where a possibility that the address is described as an address of a sender is low is set to be low. This order is determined in accordance with a divided area which is obtained by dividing a sheet into a plurality of areas. For example, it is determined that an order of an address area including an upper divided area of a sheet is low, and an order of an address area including a lower divided area of a sheet is high. In addition, it is determined that an order of an address area including a left divided area of a sheet is low, and an order of an address area including a right divided area of a sheet is high. In addition, the top and bottom, and the left and right is a position relation when a direction in which characters can be correctly read is determined as a front.

The address recognition section 118B executes an address recognition processing to a plurality of the address areas which have been extracted in the step ST12 (step ST13). The address recognition method by the address recognition section 118B may be an optional method. As an example, an address database is prepared, and a method of matching with the result that the address recognition section 118B performs character recognition of character candidates in an address area with an Optical Character Recognition (OCR) technology or the like, may be adopted. In addition, the address recognition section 118B can recognize not only a character, but can recognize a numerical character, and also can read only a postal code from the address area.

Next, the address recognition section 118B sets 1 to a variable i (step ST14). The variable i is a serial number which is numbered to each address information recognized in the steps ST12, ST13. In other words, the address recognition section 118B assigns a variable i (i=1, 2, . . . ) to each address area. In the embodiment, it is assumed that the address recognition section 118B has recognized three address areas from a sheet. In this case, the address recognition section 118B assigns i=1, 2, 3 to each address area. For example, the address recognition section 118B assigns variables i=1, 2, 3 to the address information D1, E1, F1, respectively.

Figure 7:
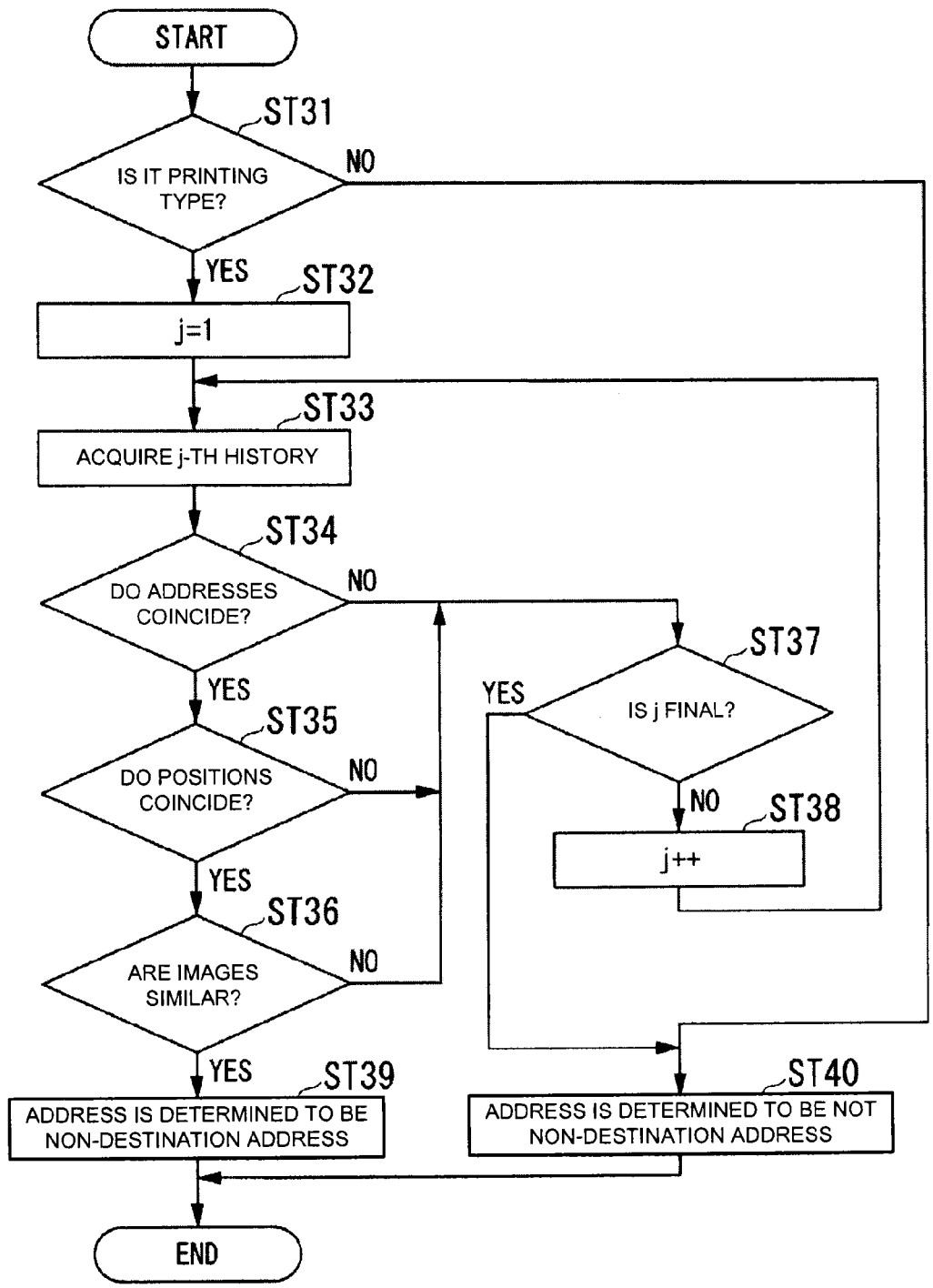
FIG. 7 is a flow chart showing an example of a flow of a processing by the non-addressee determination section of the embodiment.

Next, the non-addressee determination section 118C determines whether or not an i-th address information is a non-destination address (step ST15; FIG. 7). In addition, the non-addressee determination section 118C determines whether or not the address which has been determined to be a non-destination address is an address of a sender. When the address which has been determined to be a non-destination address is one, the non-addressee determination section 118C determines that the recognized address information is an address of a sender. On the other hand, when the addresses which have been determined to be a non-destination address are two or more, the non-addressee determination section 118C determines that the address information in which a correlated order is the lowest out of the recognized address information is an address of a sender.

FIG. 7 is a flow chart showing an example of a flow of a processing by the non-addressee determination section 118C corresponding to the step ST15. To begin with, the non-addressee determination section 118C determines whether the address described in the address area is handwritten, or described with printing type (step ST31). When having determined that the address described in the address area is handwritten, the non-addressee determination section 118C determines that the address described in the address area is not a non-destination address (step ST40). When having determined that the address described in the address area is described with printing type, the non-addressee determination section 118C proceeds to a step ST32. The meaning to determine that an address which is handwritten is not a non-destination address will be described later.

In addition, the shapes of a character and a numerical character are greatly different between the handwriting and the printing type, and thereby pattern images for pattern matching are greatly different. For this reason, as pattern images for address recognition, a pattern image for handwriting and a pattern image for printing type are separately prepared. In the embodiment, when recognizing address information from an address area, the address recognition section 118B executes both of a pattern matching using the pattern image for handwriting and a pattern matching using the pattern image for printing type. A processing to perform the both pattern matching simultaneously is called handwriting and printing type determination processing. The non-addressee determination section 118C performs the determination of a step ST21 described later, based on a processing result of the handwriting and printing type determination processing by the address recognition section 118B.

Next, the non-addressee determination section 118C sets 1 to a variable j (step ST32). The variable j is a serial number which is numbered to each record in a table stored in the history holding section 118E or the sender information storage section 118F. In the embodiment, the non-addressee determination section 118C gives serial numbers to the records stored in the sender information table TF, following the records stored in the history table TE. For example, the number of sets of information relating to the address information stored in the history table TE is N. In this case, the non-addressee determination section 118C assigns the variable j=1–N to each record stored in the history table TE. In addition, the non-addressee determination section 118C assigns a serial number starting from N+1 as the variable j to each record stored in the sender information table TF.

Figure 8:
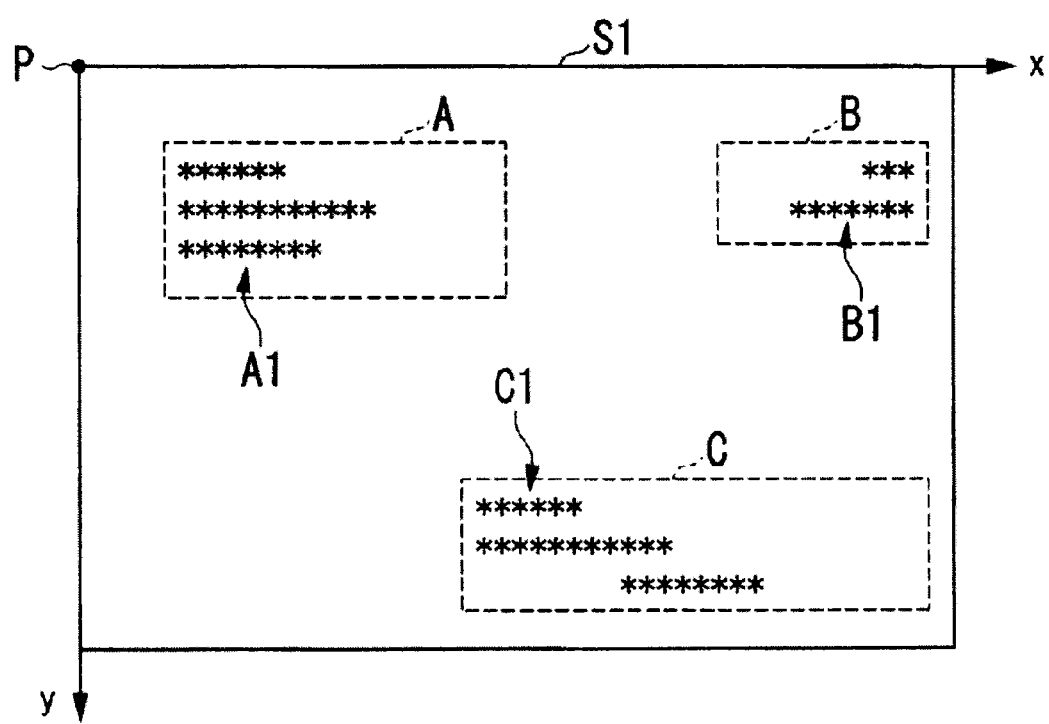
FIG. 8 is a diagram showing address information recognized in past time.

Here, the record stored in the history table TE and the record stored in the sender information table TF are based on the information recognized in the past in the step ST13 of FIG. 3. Hereinafter, it is determined, for the sake of explanation, that address information which have become origin of the records stored in the history table TE or the sender information table TF at the processing of one time before, are A1, B1, C1. FIG. 8 is a diagram showing the address information A1, B1, C1 which were recognized from a sheet S1 in past time.

The non-addressee determination section 118C reads a j-th record from the history table TE or the sender information table TF (step ST33).

The non-addressee determination section 118C determines whether or not the j-th address information and the i-th address information selected in the steps ST14-ST17 in the flow chart of FIG. 3 coincide with each other (step ST34). When determining that they do not coincide, the non-addressee determination section 118C proceeds to a processing of a step ST37. When determining that they coincide, the non-addressee determination section 118C proceeds to a processing of a step ST35.

Here, the case that the address information coincide includes a case that they coincide completely and a case that parts of them do not coincide. For example, when postal codes and addresses coincide, even when parts of the characters indicating addresses do not coincide, the non-addressee determination section 118C determines that the both address information coincide with each other.

The non-addressee determination section 118C determines whether or not the description position where the j-th address information is described and the description position where the i-th address information is described coincide with each other (step ST35). When determining that they do not coincide, the non-addressee determination section 118C proceeds to the processing of the step ST37. When determining that they coincide, the non-addressee determination section 118C proceeds to a processing of a step ST36.

Here, the case that the description positions coincide, includes a case that they coincide completely and a case that parts of them do not coincide. For example, when the coordinate of the upper left vertex of the i-th address area is included in a circle with a prescribed radius around the coordinate of the upper left vertex of the j-th address area, the non-addressee determination section 118C determines that the description positions coincide. In addition to this, the non-addressee determination section 118C may determine that the description positions coincide, on condition that the coordinate of the lower right vertex of the i-th address area is included in a circle with a prescribed radius around the coordinate of the lower right vertex of the j-th address area. In addition, when the coordinate values of the two or more vertexes of the address areas coincide, the non-addressee determination section 118C determines that the described positions coincide, and thereby can enhance the determination accuracy. The coordinates do not necessarily coincide completely due to the fluctuation for each trial of image scanning. For this reason, the non-addressee determination section 118C determines that the coordinates coincide if the difference between the coordinate values is within a definite value.

The non-addressee determination section 118C determines whether or not an image of the address area where the j-th address information is described and its periphery, and an image of the address area where the i-th address information is described and its periphery are similar, based on the determination result of the image collation section 118D (step ST36). When determining that the both images are similar, the non-addressee determination section 118C proceeds to a processing of a step ST39. When determining that the both images are not similar, the non-addressee determination section 118C proceeds to the processing of the step ST37.

In addition, as the method of determining the similarity of the images, an optional method can be used. As an example, there is a method to calculate a correlation value of the images themselves. In addition, the case that the both images are similar includes a case that they coincide completely and a case that parts of them do not coincide. For example, when the feature amounts of the images coincide by not less than a threshold value, the non-addressee determination section 118C determines that the both images are similar.

When determining that they do not coincide or are not similar to each other in the steps ST34, 35, 36, the non-addressee determination section 118C determines whether or not the processings of the steps ST34-36 based on the whole address information have been finished (step ST37). That is, the non-addressee determination section 118C determines whether or not the variable j has reached the last number. When the processings of the steps ST34-36 based on the whole address information have not been finished, the non-addressee determination section 118C proceeds to a processing of a step ST38. When the processings of the steps ST34-36 based on the whole address information have been finished, the non-addressee determination section 118C proceeds to a processing of a step ST40. In the step ST38, the variable j is incremented (step ST38).

For example, in the determination of the steps ST34-36, between the information relating to the address information A1 when j=1, and the information relating to the address information D1 when i=1, when it is determined that they do not coincide or are not similar to each other, the non-addressee determination section 118C executes the determination of the steps ST34-36, between the information relating to the address information B1 when j=2, and the information relating to the address information D1 when i=1.

When determining that the both images are similar in the step ST36, the non-addressee determination section 118C determines that the address described in the address area is a non-destination address (step ST39). And, the non-addressee determination section 118C finishes the determination processing of the step ST15 to the i-th address information.

When it is determined that the address is handwritten in the step ST31, or when it is determined that they do not coincide or are not similar to each other in the steps ST34, 35, 36, the non-addressee determination section 118C determines that the address described in the address area is not a non-destination address (step ST40). And, the non-addressee determination section 118C finishes the determination processing of the step ST15 to the i-th address information.

The description will return to the flow chart of FIG. 3. The non-addressee determination section 118C determines whether or not the processings of the step ST15 based on the address information recognized from the whole address areas have been finished (step ST16). That is, the non-addressee determination section 118C determines whether or not the variable i has reached the last number. When the processings of the step ST15 based on the address information recognized from the whole address areas have been finished, the non-addressee determination section 118C proceeds to a processing of a step ST18. When the processings of the whole areas have not been finished, the non-addressee determination section 118C proceeds to a step ST17. In the step ST17, the variable i is incremented (step ST17).

Next, the non-addressee determination section 118C excludes the address information which has been determined to be the non-destination address in the determination of the step ST15 from an address candidate of the addressee (step ST18)

Next, the non-addressee determination section 118C updates the history holding section 118E, based on the recognition result of the step ST13 (step ST19). In addition, the non-addressee determination section 118C deletes the old history stored in the history holding section 118E.

Next, the non-addressee determination section 118C updates the sender information table TF, based on the determination result of the step ST15 (step ST20). The non-addressee determination section 118C registers the information relating to the address information which is determined to be the address of the sender in the sender information table TF. In the embodiment, the non-addressee determination section 118C reads out the information relating to the address information which is determined to be the address of the sender from the history table TE, and writes it into the sender information table TF. Here, the non-addressee determination section 118C may delete the information relating to the address information which is determined to be the address of the sender from the history table TE. For example, when one sender information is specified from the sheet from which a plurality of the address information have been recognized, the non-addressee determination section 118C writes only the information relating to the one address information into the sender information table TF.

Next, the addressee determination section 118H determines whether or not the address which has been determined to be not a non-destination address by the non-addressee determination section 118C is an address of an addressee (step ST21). When the address which has been determined to be not a non-destination address is one, the addressee determination section 118H determines that the recognized address information is an address of an addressee. On the other hand, when the addresses which have been determined to be not a non-destination address are two or more, the addressee determination section 118H determines that out of the recognized address information, the address information in which the correlated order is the highest, is an address of an addressee. In addition, when the non-addressee determination section 118C determines that the address information is handwritten, based on the processing result of the handwriting and printing type determination processing, the addressee determination section 118H determines that the recognized address information is an address of an addressee.

Next, the result output section 118I outputs the address information which is determined to be an address of an addressee by the addressee determination section 118H to the controller 117 (step ST22).

When the output of the address recognition section 118B is one address, it is assumed that the address information recognized by the non-addressee determination section 118C is determined to be a non-destination address. In this case, the final destination address recognition result which the result output section 118I outputs becomes "reject". In addition, "reject" is an instruction to discharge a sheet to the VCS rejection pocket.

On the other hand, when the output of the address recognition section 118B is a plurality of addresses, the address which has not been determined to be an address of a sender is outputted as a final destination address recognition result which the result output section 118I outputs. In other words, the result output section 118I outputs the address information which has been determined to be not a non-destination address by the non-addressee determination section 118C to the controller 117. Here, when a plurality of addresses which have been determined to be not a non-destination address exist, any one address may be outputted as the final destination address recognition result which the result output section 118I outputs based on some priority order, or the final destination address recognition result may be made "reject". In other words, the result output section 118I may output the address information which is determined to be an address of an addressee, out of the address information which is determined to be not a non-destination address, to the controller 117, or the final destination address recognition result may be made "reject".

Since sheets received from a large customer are sent by a large amount, the sheets are continuously inputted into the sheet processing apparatus 101 in many cases. For the reason, a possibility that addresses of the same sender are continuously recognized from a plurality of sheets is high, and when the address information, and so on coincide with the past history, a possibility that the recognized address information is an address of a sender is high. And, it is determined whether or not the recognized address information is an address of a non-addressee, based on the information relating to the address information recognized from the sheet in past time, and thereby it is possible to suppress erroneous determination to erroneously determine an address of a sender described in a sheet as an address of an addressee.

In addition, in the case of the same sender, since the same envelopes or the like are used, a possibility that the description positions of addresses of senders and the images of the address areas of addresses of senders and the peripherals thereof are the same is high. It is determined whether or not the recognized address information is an address of a non-addressee, based on the description position of the address information and the image information of the address area of the address of the sender and the peripheral thereof which have been recognized from the sheet in past time, and thereby it is possible to enhance determination accuracy.

In addition, addresses of senders are described in printing type in sheets received from a large customer, in many cases. For the reason, a possibility that a handwritten address is not an address of a sender when a large customer is the sender is high, and when the address information and so on of the handwritten address coincide with the past history, a possibility that the handwritten address is an address of a sender is high. In addition, when an address is described in printing type, a possibility that the address described in printing type is not a non-destination address is higher than a possibility that it is a non-destination address. Accordingly, it is determined whether or not the recognized address information is an address of a non-addressee is determined, in accordance with that an address is described in printing type, or an address is handwritten, and thereby it is possible to suppress erroneous determination to erroneously determine an address of a sender described in a sheet as an address of an addressee.

In addition, sheets from a large customer are brought in not only once but periodically in many cases. For the reason, regarding a large customer who brings sheets repeatedly, it is possible to repeatedly use the information relating to the address of the sender. Accordingly, the information relating to the address information which has been determined to be the address of the sender by the non-addressee determination section 118C is stored in the sender information storage section 118F, and thereby regarding a first sheet out of sheets to be inputted continuously from a large customer, it is possible to determine whether or not the recognized address information is an address of a non-addressee. In addition, even when a sheet from another sender is mixed among a plurality of sheets from a large customer, it is possible to determine whether or not the recognized address information is an address of a non-addressee, from the next sheet.

In addition, the I/F section 118G which accepts editing of the information relating to an address of a sender stored in the sender information storage section 118F is provided. With this configuration, even when a name, an address of a large customer, or a logo or the like of the company is changed, it is possible to update the information relating to an address of a sender to the correct information. In addition, even when an image read by the scanner 114 is unclear, it is possible to update the image to a clear image. Accordingly, it is possible to improve the determination accuracy by the non-addressee determination section 118C.

In the above-described embodiment, the example that the address recognition function section 118 determines whether or not the recognized address information is a non-destination address, based on the comparison result of the sheet S1 and the sheet S2 has been described, but it is not limited to this. For example, the address recognition function section 118 may determine whether or not the recognized address information is a non-destination address, based on the comparison result of the sheet S2 and a plurality of the sheets in past time. For example, when the information relating to the address information recognized from two or more sheets out of the sheets in past time coincide with the information relating to the address information F of the sheet S2, the address recognition function section 118 determines that the address information F is a non-destination address. In addition, the address recognition function section 118 may determine whether or not the address information F is a non-destination address, in accordance with a proportion of the number of sheets which coincide with the information relating to the address information F and the number of sheets which do not coincide with the information relating to the address information F, among sheets in past time. For example, when the information relating to the address information recognized from sheets of a half or more of sheets in past time coincide with the information relating to the address information F of the sheet S2, the address recognition function section 118 determines that the address information F is a non-destination address. With these configurations, it is possible to enhance the determination accuracy to determine whether or not the recognized address information is a non-destination address.

In the above-described embodiment, the non-addressee determination section 118C obtains a determination score in accordance with an elapsed time after the address information is recognized from a sheet in past time, and may determine whether or not the recognized address information is a non-destination address, based on the obtained determination score. For example, a determination score of the determination result from the past history near to the nearest preceding time is made higher than a determination score of the determination result from the past history far from the nearest preceding time. By this means, regarding sheets from a large customer that brought continuously a plurality of sheets, it is possible to enhance determination accuracy to determine whether or not the recognized address information is a non-destination address.

Figure 9:
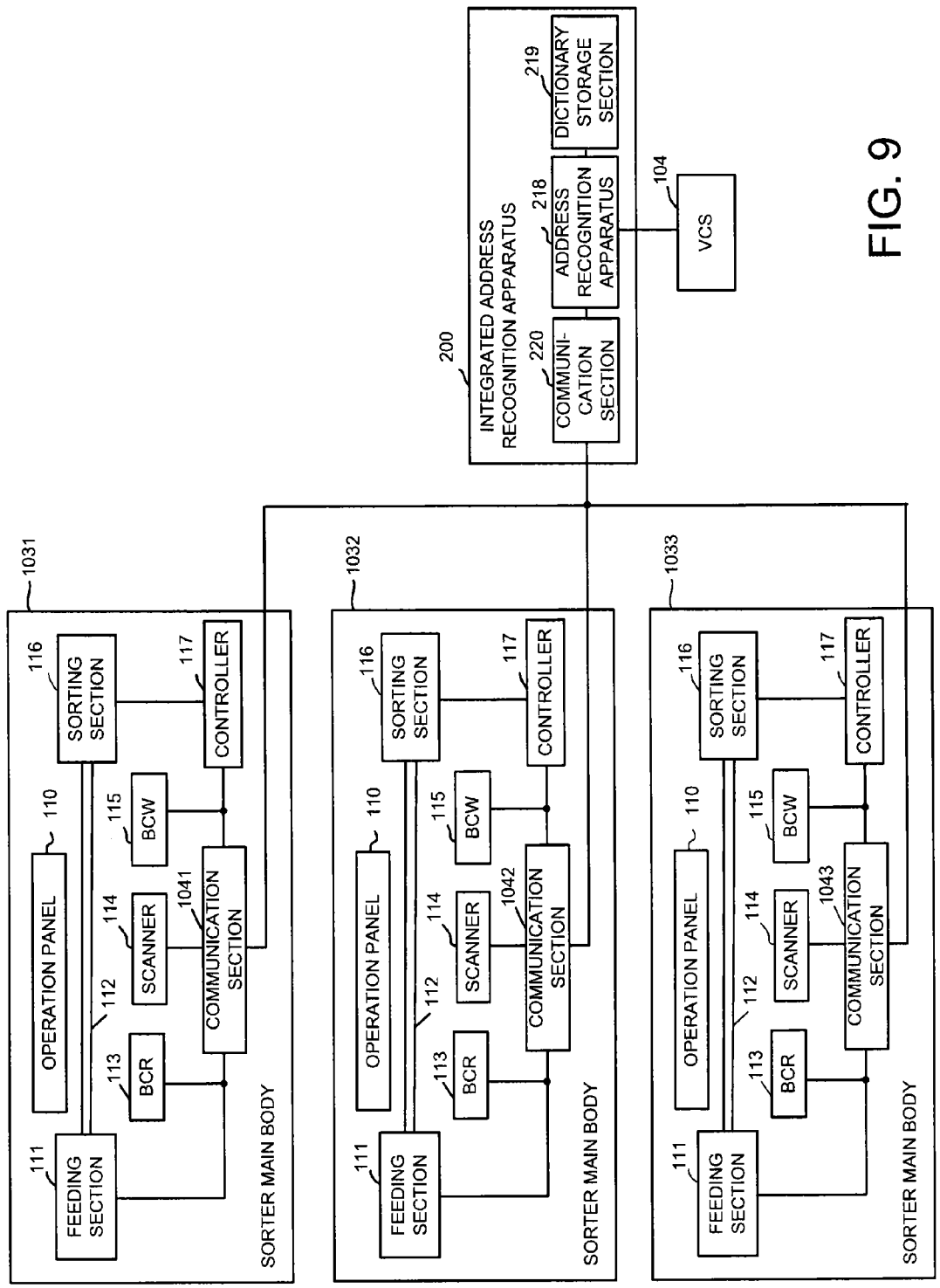
FIG. 9 is a diagram showing a configuration of a system provided with an integrated address recognition apparatus of an embodiment.

In the above-described embodiment, the example in which the address recognition function section 118 is incorporated in the sorter main body 103 has been described, but it is not limited to this. For example, the address recognition function section 11 may be provided outside the sorter main body 103. In addition, the address recognition function section 118 may be connected to a plurality of the sorter main bodies 103, and may be incorporated in an integrated address recognition apparatus. An example of a system provided with this integrated address recognition apparatus will be specifically described with reference to FIG. 9. FIG. 9 is a diagram showing a configuration of a system provided with an integrated address recognition apparatus.

As shown in FIG. 9, an integrated address recognition apparatus 200 is provided with a communication section 220, an address recognition apparatus 218, a dictionary storage section 219.

The address recognition apparatus 218 is connected to a plurality of sorter main bodies 1031, 1032 and 1033.

The plurality of sorter main bodies 1031, 1032 and 1033 are respectively provided with communication sections 1041, 1042 and 1043. The communication sections 1041, 1042 and 1043 are connected to the controllers 117, and the respective sections of the sorter main bodies 1031, 1032 and 1033, respectively.

The communication sections 1041, 1042 and 1043 respectively transmit images which the scanners 114 have read to the address recognition apparatus 218. The communication sections 1041, 1042 and 1043 receive information from the address recognition apparatus 218, and output the information to the controllers 117, respectively.

The address recognition apparatus 218 is connected to the communication section 220 and the dictionary storage section 219. The communication section 220 receives the image information which the scanners 114 have read, from the sorter main bodies 1031, 1032 and 1033. The address recognition apparatus 218 executes the same processing as the address recognition function section 118, based on the image information received respectively from the sorter main bodies 1031, 1032 and 1033. The address recognition apparatus 218 determines any one of the address information recognized from the images to be an address of an addressee. The communication section 220 transmits the address information which has been determined to be the address of the addressee by the address recognition apparatus 218 to at least to one of the sorter main bodies 1031, 1032 and 1033. Here, it is preferable that the communication section 220 transmits the determination result by the address recognition apparatus 218 based on the relevant image information to the sorter main body which has received the image information read by the scanner 114, out of the sorter main bodies 1031, 1032 and 1033.

In addition, the address recognition apparatus 218 is connected to the VCS 104. The address recognition apparatus 218 outputs the image of the sheet from which address information could not be recognized to the VCS 104.

One address recognition apparatus 218 is prepared for a plurality of the sorter main bodies 1031, 1032, 1033 as in this manner, and thereby the number of the address recognition apparatuses 218 can be made smaller than the number of the sorter main bodies 1031, 1032, 1033. By this means, it is possible to reduce the cost for preparing a plurality of the address recognition apparatuses 218.

According to at least one embodiment described above, the non-addressee determination section 118C which determines whether or not the address information read from the sheet S2 is a non-destination address, based on the comparison result of the information relating to the address information read from the sheet S2 and the information relating to the address information read from the different sheet S1 more previously than the sheet S2 is provided. With this configuration, it is possible to suppress erroneous determination to erroneously determine an address of a sender described in a sheet as an address of an addressee.

In addition, the non-addressee determination section 118C determines whether or not the address information read from the sheet S2 is a non-destination address, based on the comparison result of the information relating to the address information read from the sheet S2 and the information relating to the address information read from a plurality of different sheets S1, . . . more previously than the sheet S2. By this means, it is possible to enhance determination accuracy by the non-addressee determination section 118C.

In addition, the addressee determination section 118H which determines whether or not the recognized address information is an address of an addressee, based on the address information which has been determined to be not a non-destination address by the non-addressee determination section 118C is provided. By this means, it is possible to suppress erroneous determination to erroneously determine an address of a sender described in a sheet as an address of an addressee.

The cases have been described that in the address recognition function section 118 and the address recognition apparatus 218 of each of the above described embodiments, a function (program) for performing the present embodiment is previously set inside the apparatus, but without limited to this, the same function (program) may be downloaded from a network to the apparatus, or one in which the same function (program) is stored in a recording medium may be installed in the apparatus. Regarding the recording medium, the form thereof may be any form, if it is a recording medium such as an optical disk, a USB memory which can store a program and from which the apparatus can read the program. In addition, the function which is obtained by previously installing or downloading like this may be one which can realize the function by cooperating with OS (Operating System) and so on inside the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An address recognition apparatus, comprising:
circuitry configured to
acquire, based on an image of an object, address information provided on the object,
determine, based on a comparison result of information relating to first address information on the object acquired at a desired timing, and information relating to second address information acquired before the first address information, whether or not the first address information on the object acquired after the second address information is a non-destination address that is not an address of an addressee, the determining including determining, based on comparison results of a plurality of the first address information respectively acquired from a plurality of areas of the object and a plurality of the second address information, whether or not each of the first address information is the non-destination address,
determine whether or not each said first address information that is not the non-destination address is a candidate for the address of the addressee, and
determine the address of the addressee by analyzing each said candidate for the address of the addressee without analysis of each said first address information determined to be the non-destination address,
wherein, in a first case of only one said candidate for the address of addressee, the determining the address of the addressee determines said only one candidate is the address of the addressee, and in a second case of multiple said candidates for the address of the addressee, the determining the address of the addressee determines that one of the candidates having a highest correlation order is the address of the addressee.

2. The address recognition apparatus according to claim 1, wherein:
the circuitry determines that the first address information is the non-destination address when the first address information and the second address information coincide with each other.

3. The address recognition apparatus according to claim 1, wherein:
the circuitry determines that the first address information is the non-destination address when a description position where the first address information is provided on the object and a description position associated with where the second address information is provided coincide with each other.

4. The address recognition apparatus according to claim 1, wherein:
the circuitry determines that the first address information is the non-destination address when an image of a periphery of an address area where the first address information is provided on the object and an image of a periphery of an address area associated with where the second address information is provided are similar.

5. The address recognition apparatus according to claim 1, wherein:

the circuitry is configured to determine that the address information is not the non-destination address when the address information is handwritten.

6. The address recognition apparatus according to claim 1, wherein:
the circuitry determines whether or not the first address information is the non-destination address based on a comparison result of the information relating to the first address information and the information relating to a plurality of the second address information which are respectively acquired from different objects.

7. The address recognition apparatus according to claim 1, wherein:
the circuitry determines that the first address information is the non-destination address when a plurality of the comparison results that the first address information is determined to be the non-destination address exist, based on comparison results of the information relating to the first address information and the information relating to a plurality of the second address information.

8. The address recognition apparatus according to claim 1, wherein:
the circuitry determines whether or not the first address information is the non-destination address, in accordance with a proportion of comparison results that the first address information is determined to be the non-destination address and comparison results that the first address information is determined to be not the non-destination address, out of a plurality of comparison results obtained continuously.

9. The address recognition apparatus according to claim 1, wherein:
the circuitry is configured to store information relating to the address information which has been determined to be the non-destination address, and
the circuitry determines whether or not the first address information is the non-destination address, based on a comparison result of the information relating to the stored address information and the information relating to the first address information.

10. The address recognition apparatus according to claim 9, wherein:
the circuitry is configured to accept an editing command to edit information relating to the address of the non-destination address.

11. The address recognition apparatus according to claim 1, wherein:
the circuitry outputs address information determined to be not the non-destination address, out of the acquired address information.

12. The address recognition apparatus according to claim 1, further comprising:
a camera configured to capture the address information provided on the object,
wherein the circuitry acquires the address information based on an image captured by the camera.

13. A sorting apparatus, comprising:
the address recognition apparatus according to claim 1; and
a sorting mechanism which sorts the object in accordance with a destination of the object based on address information determined to be not the non-destination address.

14. An integrated address recognition apparatus, comprising:
the address recognition apparatus according to claim 1; and
communication circuitry configured
to communicate with a plurality of sorting apparatuses, each of which has a camera configured to capture the address information provided on the object, and sort the object in accordance with a destination of the object, based on information determined to be not the non-destination address by the address recognition apparatus,
receive images which the cameras have captured from the plurality of the sorting apparatuses, and
transmit a determination result of the address recognition apparatus to at least one of the plurality of the sorting apparatuses.

15. An address recognition method, comprising:
acquiring, based on an image of an object, address information provided on the object;
determining, based on a comparison result of information relating to first address information on the object acquired at a desired timing, and information relating to second address information acquired before the first address information, whether or not the first address information on the object acquired after the second address information is a non-destination address that is not an address of an addressee, the determining including determining, based on comparison results of a plurality of the first address information respectively acquired from a plurality of areas of the object and a plurality of the second address information, whether or not each of the first address information is the non-destination address;
determining whether or not each said first address information that is not the non-destination address is a candidate for the address of the addressee; and
determining the address of the addressee by analyzing each said candidate for the address of the addressee without analysis of each said first address information determined to be the non-destination address,
wherein, in a first case of only one said candidate for the address of addressee, the determining the address of the addressee determines said one candidate is the address of the addressee, and in a second case of multiple said candidates for the address of the addressee, the determining the address of the addressee determines that one of the candidates having a highest correlation order is the address of the addressee.

* * * * *